United States Patent [19]

Choi

[11] Patent Number: 5,495,290
[45] Date of Patent: Feb. 27, 1996

[54] VIDEO CAMERA HAVING A VIEW FINDER WITH A SHIELD

[75] Inventor: Sung-Kwan Choi, Seoul, Rep. of Korea

[73] Assignee: Daewoo Electronics Co., Ltd., Seoul, Rep. of Korea

[21] Appl. No.: 329,361

[22] Filed: Oct. 26, 1994

[30] Foreign Application Priority Data

Oct. 26, 1993 [KR]  Rep. of Korea ...................... 93-22361

[51] Int. Cl.⁶ .................................................. H04N 5/225
[52] U.S. Cl. ........................................... 348/333; 348/376
[58] Field of Search ..................................... 348/333, 373, 348/375, 376; 354/219; 359/600; H04N 5/225

[56] References Cited

U.S. PATENT DOCUMENTS 4,032,940   6/1977   Chan ......................................... 354/219

FOREIGN PATENT DOCUMENTS 4094271   3/1992   Japan ............................. H04N 5/225
6086195   3/1994   Japan ............................. H04N 5/225

*Primary Examiner*—Wendy R. Greening
*Attorney, Agent, or Firm*—Anderson Kill Olick & Oshinsky

[57] ABSTRACT

A view finder of a video camera is provided with a lens for enlarging the picture; a housing accommodating the lens therewithin; an eye cup mounted to the housing; and a shield detachably mounted to the eye cup for preventing a contaminant from flowing into the view finder. The shield fits into a camera lens cap of the video camera having one or more pairs of protrusions while video camera is in use. Further, the shield engaged with the camera lens cap is mounted to a holder attached to a handle of the video camera.

2 Claims, 4 Drawing Sheets

VIDEO CAMERA HAVING A VIEW FINDER WITH A SHIELD

FIELD OF THE INVENTION

The present invention relates to a video camera; and, more particularly, to a view finder of a video camera capable of providing a clear image to a user.

DESCRIPTION OF THE PRIOR ART

Generally speaking, a video camera includes a main body having a camera section for sensing a light from an object; and a view finder mounted on the main body. The view finder has a cathode ray tube (CRT), a lens and an eye cup so that the user may observe the picture of an object sensed by the camera section. In this conventional view finder, the lens is vulnerable to contamination caused by the contaminants entering through the eye cup. Such contamination creates a nuisance as the cleaning of the lens is often cumbersome and time-consuming.

SUMMARY OF THE INVENTION

Accordingly, it is a primary object of the present invention to provide a view finder of a video camera having a protective shield capable of preventing a contaminant from flowing into the lens therein.

The above and other objects of the present invention are accomplished by providing a view finder of a video camera for displaying a picture, which comprises:

a lens for enlarging the picture;

a housing accommodating the lens therein;

an eye cup mounted to the housing; and a protective shield detachably mounted to the eye cup for preventing a contaminant from flowing through the eye cup.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1:
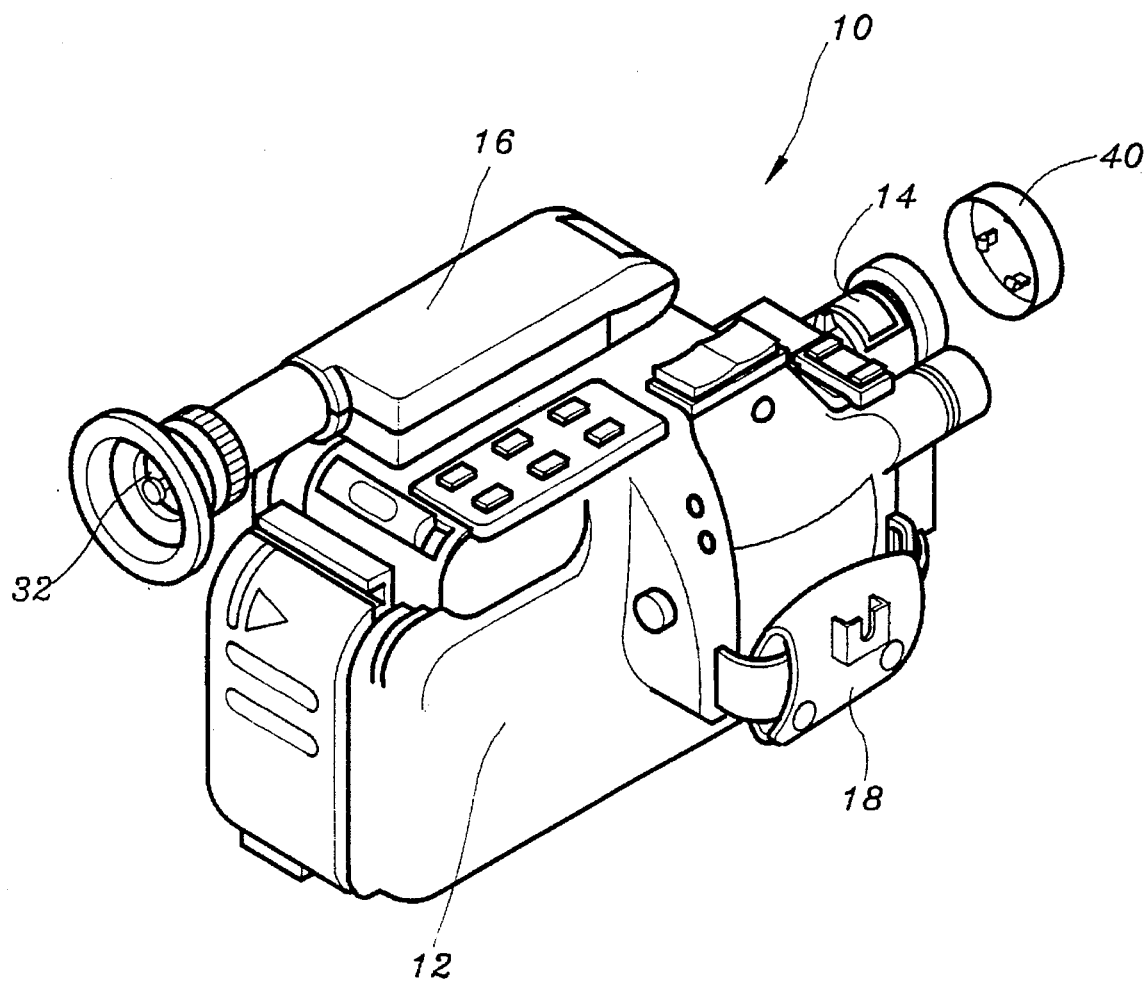
FIG. 1 is a schematic perspective view of a video camera in accordance with the present invention.

Referring to FIG. 1, a video camera 10 includes a main body 12 having a camera section 14 for sensing a light from an object; and a view finder 16 for providing a picture of the sensed object to a user. The video camera 10 also has a handle 18 attached to a side of the main body 12 for facilitating the handling or gripping of the video camera 10. The camera section 14 has an object lens group (not shown) for collecting the light from the object; a charge coupled device (CCD) (not shown) for converting the light into an electric signal; and a camera lens cap 40 for protecting the object lens group. The view finder 16 is rotatably mounted on the main body 12 so as to be upwardly rotated about its base portion; and is electrically connected to the camera section 14.

Figure 2:
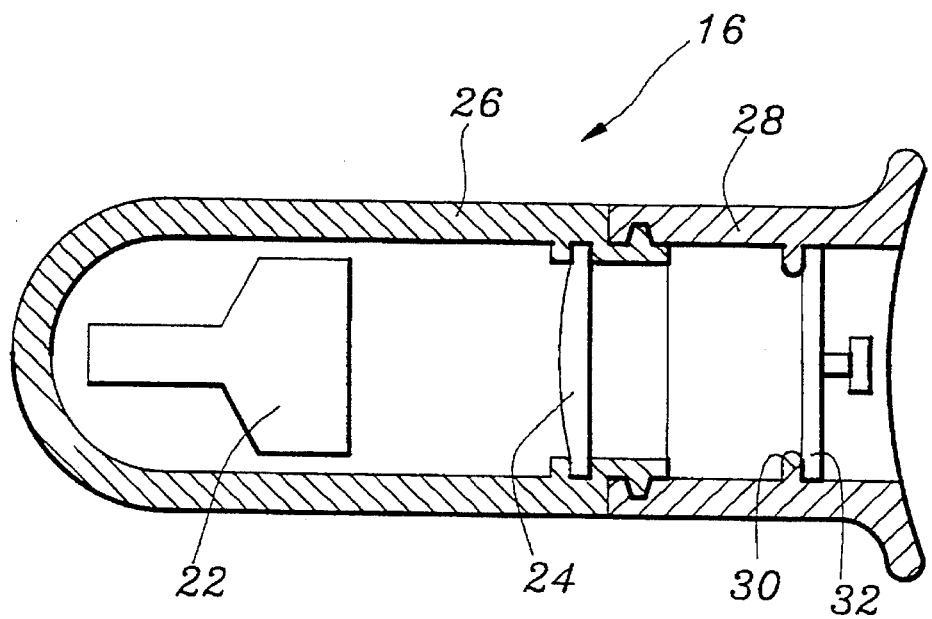
FIG. 2 is a schematic sectional view of the view finder shown in FIG. 1.

As shown in FIG. 2, the view finder 16 includes a cathode ray tube (CRT) 22, a lens 24, an eye cup 28 and a protective shield 32. The CRT 22 produces the picture from the electric signal obtained from the camera section 14; and the lens 24 enlarges the picture, formed on the screen of the CRT 22. The lens 24 and the CRT 22 are accommodated within a view finder housing 26. The eye cup 28 is detachably mounted to the housing 26; and made of a rubber material. The protective shield 32 tightly fits into the eye cup 28 to form a barrier against a contaminant, e.g., dust, so as to protect the lens 24 against contamination. The eye cup 28 preferably has a stopper 30 projecting from an inner surface thereof to prevent the shield 32 from being inserted excessively.

Figure 3:
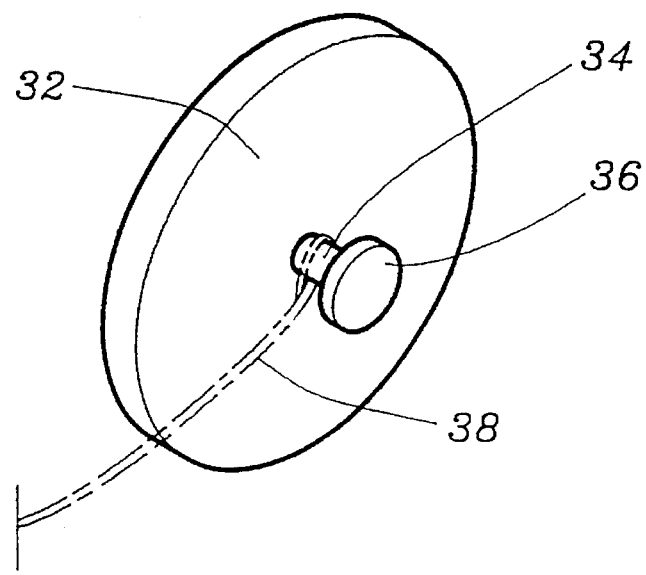
FIG. 3 is a perspective view of the protective shield depicted in FIG. 2.

Referring to FIG. 3, an engagement projection 34 extends from a central portion of the shield 32 for facilitating the removal of the shield 32 before photographing. A string 38, which is connected to a suitable position of the video camera 10, e.g., the handle 18, and the camera lens cap 40, is preferably attached to the projection 34. The projection 34 has a flange 36 to prevent the string 38 from disengaging. The shield 32 as shown may be circular. However, it should be understood that the shield 32 may have other shapes adapted to correspond to the cross section of the eye cup 28.

Figure 4:
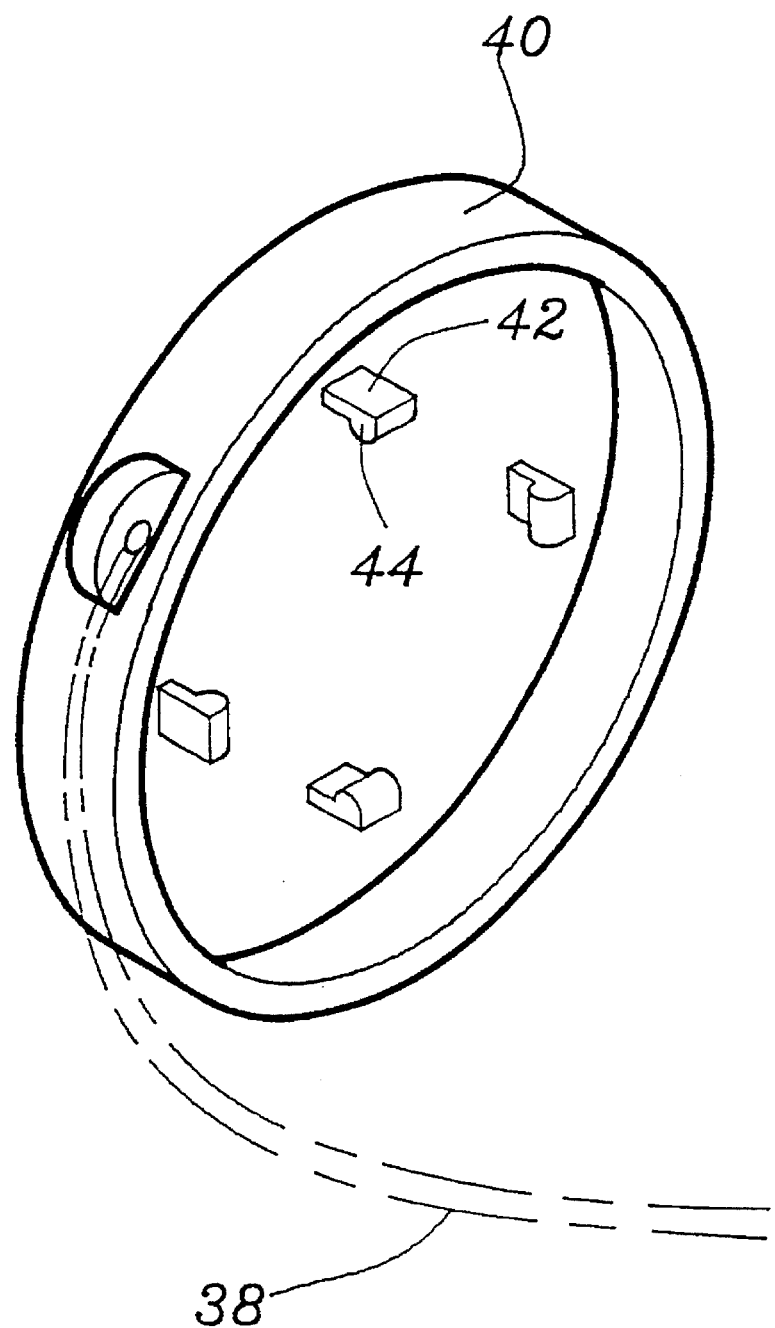
FIG. 4 is a perspective view of the camera lens cap illustrated in FIG. 1.

The camera lens cap 40 has one or more pairs of protrusions 42 diametrically positioned, as depicted in FIG. 4. Each protrusion 42 extends from an inner surface of the camera lens cap 40; and has a semi-circular barb 44 projected radially inwardly at an end portion thereof. The distance between the protrusions 42 diametrically placed is longer than the diameter of the shield 32 at areas of the protrusions 42 near to the inner surface of the camera lens cap 40; and shorter at top portions of the barbs 44. This configuration allows the shield 32 to be engaged with and disengaged from the camera lens cap 40, as desired. The camera lens cap 40 is preferably made of a resilient plastic resin.

Figure 5:
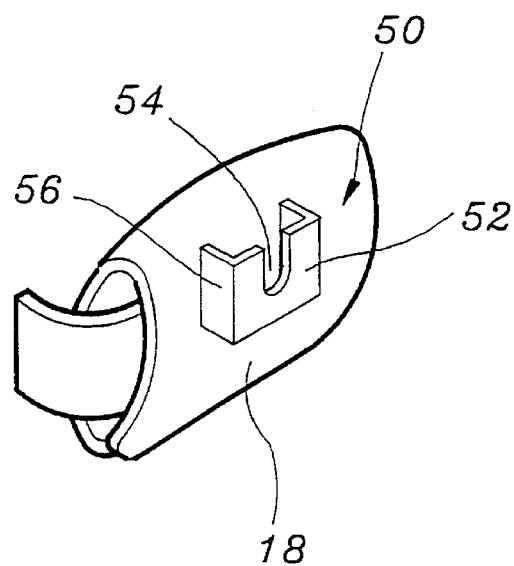
FIG. 5 is a perspective view of the holder represented in FIG. 1.

The shield 32 which is engaged with the cap 40 may be attached to a holder 50 depicted in FIG. 5. The holder 50 mounted to the handle 18 includes a front wall 52 and a pair of side walls 56 to define a cavity capable of receiving the flange 36 of the shield 32. A recess 54 formed at the front wall 52 is configurated so that the projection 34 is inserted and the flange 36 comes in contact with an inner surface of the front wall 52.

Figure 6:
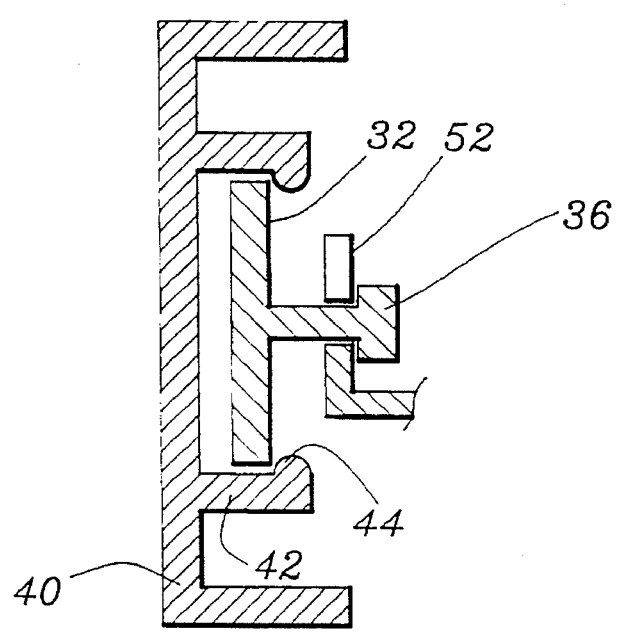
FIG. 6 is a sectional view of the shield and the camera lens cap attached to the holder.

When the video camera 10 is in use, the shield 32 is engaged with the camera lens cap 40 to be hanged on the holder 50, as shown in FIG. 6.

Although the invention has been shown and described with respect to the exemplary embodiments, it should be understood that various changes, modifications and additions may be made without departing from the spirit and scope of the invention.

What is claimed is:

1. A view finder for use in a video camera for displaying a picture, which comprises:

a lens for enlarging the picture;

a housing accommodating the lens therein;

an eye cup mounted to the housing and having a stopper projected from an inner surface thereof; and a protective shield having an engagement projection extended from a central portion thereof, said protective shield being detachably mounted to the eye cup for preventing a contaminant from flowing into the view finder.

2. A video camera comprising:

a main body having a camera section for sensing a light from an object;

a camera lens cap having at least one pair of diametrically situated protrusions, said camera lens cap being detachably attached to the camera section;

a handle having a holder and mounted to a side of the main body for facilitating the gripping of the video camera; and a view finder mounted to the main body for displaying a picture of the object, wherein said view finder includes a lens for enlarging the picture, a housing for accommodating the lens therewithin, an eye cup mounted to the housing and having a stopper projected from an inner surface thereof, and a protective shield having an engagement projection extended from a central portion thereof, said protective shield being detachably mounted to the eye cup for preventing a contaminant from flowing into the view finder, each of the protrusions in said camera lens cap has a semicircular barb projected radially inwardly from an end portion of said each protrusion for engaging said protective shield with said each protrusion when the camera lens cap is detached from the camera section, and said holder of said handle has a cavity for receiving said protective shield engaged with said camera lens cap.

* * * * *